(Model.)
J. B. CONLAN.
BELT TIGHTENER.
No. 282,500. Patented Aug. 7, 1883.
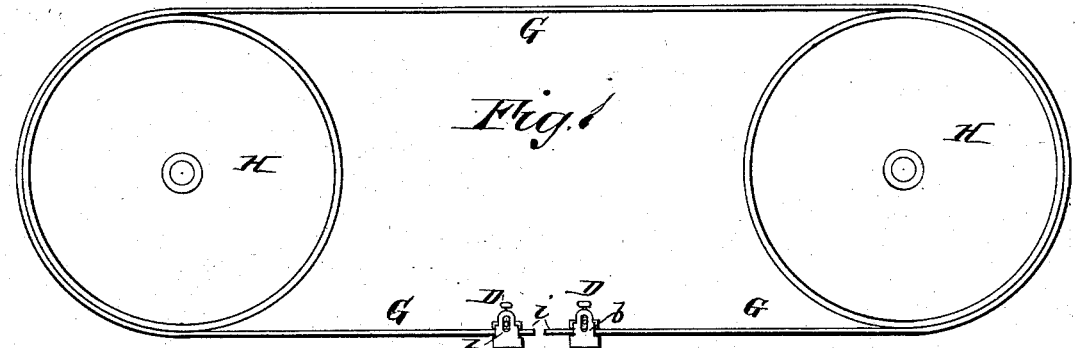
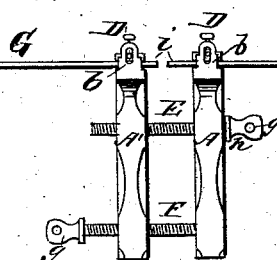
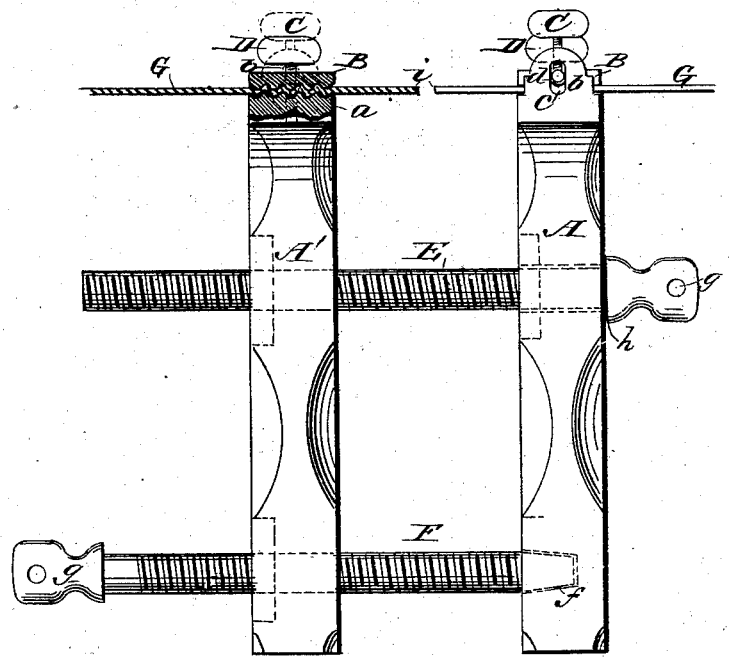
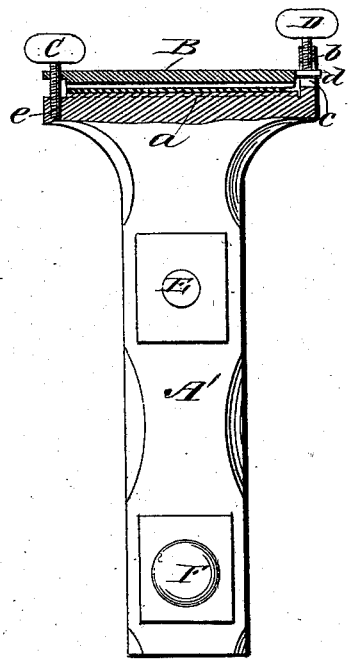
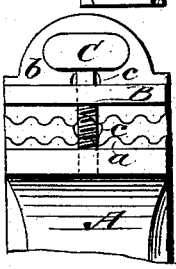
WITNESSES:
Francis McArdle
C. Sedgwick
INVENTOR:
J. B. Conlan
BY Munn & Co.
ATTORNEYS.

UNITED STATES PATENT OFFICE.

JAMES B. CONLAN, OF RICHBURG, NEW YORK.

BELT-TIGHTENER.

SPECIFICATION forming part of Letters Patent No. 282,500, dated August 7, 1883.

Application filed December 27, 1882. (Model.)

*To all whom it may concern:*

Be it known that I, JAMES B. CONLAN, of Richburg, in the county of Allegany and State of New York, have invented a new and Improved Belt-Tightener, of which the following is a full, clear, and exact description.

My invention relates to devices for taking up the slack of power-transmitting belts while on their pulleys, to avoid slip of the belts and consequent waste of power, and the accompanying disadvantages of irregular speed and action of machinery connected by the pulleys and belts with the source of power.

The invention consists in a pair of strong stocks, each provided with fixed and adjustable corrugated clamping-jaws for gripping the belt near its ends, the stocks being also fitted with screws for drawing the ends of the belt together for joining after they are secured in the clamping-jaws, as will be hereinafter fully described.

Reference is to be had to the accompanying drawings, forming part of this specification, in which similar letters of reference indicate corresponding parts in all the figures.

Figure 1 represents my improved belt-tightener as applied to use. Fig. 2 is a partly-sectional front elevation thereof in larger size. Fig. 3 is a side elevation of one of the stocks, with its clamping-jaws in section; and Fig. 4 is an edge view of one stock-head at the open ends of the clamping-jaws.

A A' represent a pair of strong stocks, constructed alike as regards their belt-clamping jaws, which are made long or broad to receive wide belts; and it consists of a lower corrugated grip-jaw, $a$, formed on or fixed to the head of the stock, from which rises at one end a housing-plate, $b$, vertically slotted at $c$, to receive a pin or tongue, $d$, fixed to the end of the upper corrugated grip-jaw, B, which ranges along over jaw $a$ and receives loosely a clamping thumb-screw, C, which is screw-threaded into the stock at $e$, so that when the screw D, threaded into the housing-plate $b$ over slot $c$, is properly adjusted to the thickness of the belt, which is admitted at the ends of the jaws next screw C, the latter may be turned to close upper grip-jaw, B, down upon the belt, to clamp it firmly and evenly its entire width between jaws $a$ B and hold the ends of the belt from loosening or slipping out under the heavy strain of the stock-screws E F in drawing the ends of the belt together for lacing or otherwise joining them, as next described. The screw E passes freely through stock A, but works in a threaded hole of stock A', and screw F, which also works in a threaded hole of stock A' at its lower end, enters by its point a socket, $f$, of stock A. The screws E F each have bored heads $g$, to receive lever-handles for turning the screws; or hand-wheels may be fitted to the screws for this purpose, as desired. These screws E F are of ample length to permit separation of stocks A A' for clamping of the cut belt G (shown on its pulleys H in Fig. 1) by the jaws $a$ B of each stock at variable distances from the extreme ends $i$ of the belt, to accommodate the size, location, and condition of the belt and the kind of fastening used for joining it.

In using the tightener the stocks A A' are adjusted the proper distance apart, with the shoulder $h$ of screw E resting against stock A and the screw F seated in socket $f$ thereof, the screws C are withdrawn from the stocks, and the belt ends, after being suitably cut to take up the slack of the belt, are entered between and firmly clamped by the jaws $a$ B, as above described, whereupon the screw F is forcibly turned to bring the tops of the stocks A A' toward each other, straining the belt G tightly over its pulleys H and holding its ends $i$ squarely, to be laced or otherwise joined by the operator at his leisure, and with comparative comfort, and without undue strain upon any part of the fastening, thus insuring satisfactory results.

The advantages of my invention will readily be appreciated by users of power, as an evenly-strained and well-joined belt not only transmits power without excessive slip and consequent loss, but insures a desirable regularity of motion, which is important in most classes of machinery.

Having thus described my invention, what I claim as new, and desire to secure by Letters Patent, is—

1. A belt-tightener constructed with a pair of stocks, A A', each fitted at its head with fixed and movable jaws $a$ B, for clamping the ends of the belt, and having screws E F, adapted to strain the belt and draw its clamped ends together for joining, substantially as shown and described.

2. The combination, with stocks A A', of belt-clamping devices consisting of fixed grip-jaw a, housing-plate b, slotted at c and fitted with screw D, and the adjustable grip-jaw B, fitting by tongue d in plate b, and carrying a screw, C, threaded to the stock at the open end of the clamp, substantially as shown and described.

3. The stocks A A', fitted with fixed and adjustable grip-jaws a B, as described, said jaws being corrugated lengthwise for gripping the belt ends crosswise to prevent their slipping under strain, as set forth.

4. The combination, with stocks A A', fitted at their heads with fixed and adjustable grip-jaws a B, as described, of the shouldered screw E, passing freely through stock A and threaded into stock A', and the screw F, threaded into stock A' and socketed in stock A, substantially as set forth.

JAMES B. CONLAN.

Witnesses:
EDWIN S. BLISS,
OLIVER R. MEHAFFEY.